(12) United States Patent
Kappel et al.

(10) Patent No.: US 12,365,285 B1
(45) Date of Patent: Jul. 22, 2025

(54) VEHICLE AMBIENT LIGHT SYSTEM WITH OVERLAPPED LIGHT ASSEMBLIES

(71) Applicant: FCA US LLC, Auburn Hills, MI (US)

(72) Inventors: Matthew R Kappel, Auburn Hills, MI (US); Fernando M Garza Villarreal, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/744,968

(22) Filed: Jun. 17, 2024

(51) Int. Cl.
*B60Q 3/54* (2017.01)
*B60Q 3/12* (2017.01)
*B60Q 3/217* (2017.01)
*B60Q 3/62* (2017.01)

(52) U.S. Cl.
CPC ............... *B60Q 3/54* (2017.02); *B60Q 3/12* (2017.02); *B60Q 3/217* (2017.02); *B60Q 3/62* (2017.02)

(58) Field of Classification Search
CPC ... B60Q 3/54; B60Q 3/62; B60Q 3/12; B60Q 3/217; B60Q 3/85; B60Q 3/80; B60Q 3/64; B60Q 3/233
See application file for complete search history.

(56) References Cited

U.S. PATENT DOCUMENTS

| 2014/0211498 A1* | 7/2014 | Cannon | B60Q 3/217 |
| | | | 362/555 |
| 2017/0217366 A1* | 8/2017 | Kraemer | B60Q 3/233 |
| 2023/0173978 A1* | 6/2023 | Tontsch | B60Q 3/20 |
| | | | 362/556 |

FOREIGN PATENT DOCUMENTS

| CN | 117663040 A | * | 3/2024 | ............... B60Q 3/54 |
| CN | 119189895 A | * | 12/2024 | ............. B60Q 1/324 |

OTHER PUBLICATIONS

Innovation Q+ NPL Search (Year: 2024).*
Car and Driver; See Interior Photos of the 2024 Dodge Charger Daytona; dated Mar. 5, 2024; (17 pages) https://www.caranddriver.com/photos/g60047009/2024-dodge-charger-daytona-interior-gallery/?slide=1.
YouTube; Dodge the Next-Gen Charger; https://www.youtube.com/watch?v=uGAZkn11hcw; dated Mar. 5, 2024; (1 pages).

* cited by examiner

*Primary Examiner* — Anabel Ton
(74) *Attorney, Agent, or Firm* — Jeremy J. Klobucar

(57) ABSTRACT

An assembly for a vehicle includes first and second interior trim components with a gap or seam between them, and first and second lighting assemblies. The first lighting assembly includes a first light source and a first light receptacle into which light is emitted from the first light source and from which light is emitted onto the first interior trim component. The second lighting assembly includes a second light source and a second light receptacle into which light is emitted from the second light source and from which light is emitted onto the second interior trim component. The first light receptacle overlaps the second light receptacle and light from one or both of the first light receptacle and the second light receptacle is emitted onto the first interior trim component, the gap and the second interior trim component.

18 Claims, 3 Drawing Sheets

VEHICLE AMBIENT LIGHT SYSTEM WITH OVERLAPPED LIGHT ASSEMBLIES

FIELD

The present disclosure relates to a system for ambient lighting in a vehicle.

BACKGROUND

Some vehicles include some ambient lighting in discrete areas or sections of the vehicle interior. In between areas that include the ambient lighting are unlit areas resulting in discontinuous and non-uniform lighting.

SUMMARY

In at least some implementations, an assembly for a vehicle, includes a first interior trim component, a second interior trim component located adjacent to the first interior trim component with a gap or seam between the second interior trim component and the first interior trim component, a first lighting assembly and a second lighting assembly. The first lighting assembly is associated with the first interior trim component and includes a first light source and a first light receptacle into which light is emitted from the first light source and from which light is emitted onto the first interior trim component. The second lighting assembly is associated with the second interior trim component and includes a second light source and a second light receptacle into which is light emitted from the second light source and from which light is emitted onto the second interior trim component. The first light receptacle overlaps the second light receptacle and light from one or both of the first light receptacle and the second light receptacle is emitted onto the first interior trim component, the gap and the second interior trim component.

In at least some implementations, the first light source and second light source include at least one LED light.

In at least some implementations, the first light receptacle and the second light receptacle are overlapped in two directions that are perpendicular to each other, and wherein the gap extends in a third direction perpendicular to the two directions. In at least some implementations, a portion of the first interior trim panel overlaps a portion of the second interior trim panel. In at least some implementations, the first interior trim panel is at least part of an instrument panel of the vehicle and the second interior trim panel is connected to a door of the vehicle, and wherein the portion of the first interior trim panel overlaps the portion of the second interior trim panel when the door is in a closed position.

In at least some implementations, the first lighting assembly includes a first housing that defines part of the first interior trim panel and wherein light emitted from the first lighting assembly is emitted onto the first housing.

In at least some implementations, the second lighting assembly includes a second housing that defines part of the second interior trim panel and wherein light emitted from the second lighting assembly is emitted onto the second housing.

In at least some implementations, the first lighting assembly includes an outlet from which light is emitted and the second lighting assembly includes an outlet from which light is emitted, and wherein a portion of the outlet of the first lighting assembly overlaps a portion of the outlet of the second lighting assembly so that some of the light emitted from the first lighting assembly is directed onto the same portion of at least one of the first interior trim panel and the second interior trim panel as some of light emitted from the second lighting assembly. In at least some implementations, the overlapped portions of the first lighting assembly and the second lighting assembly are in areas of the outlets at which the light emitted is at least 30% of the nominal output along the length of one or both of the first light receptacle and the second light receptacle.

In at least some implementations, the first light receptacle overlaps the second light receptacle by between 1 mm and 50 mm in a first direction.

In at least some implementations, a vehicle includes a passenger compartment defined in part by an instrument panel and a door panel, wherein the door panel is located adjacent to the instrument panel with a gap or seam between the door panel and the instrument panel, a first lighting assembly associated with the instrument panel, and a second lighting assembly associated with the door panel. The first lighting assembly includes a first light source and a first light receptacle into which light is emitted from the first light source and from which light is emitted onto the instrument panel. The second lighting assembly includes a second light source and a second light receptacle into which light is emitted from the second light source and from which light is emitted onto the door panel. The first light receptacle overlaps the second light receptacle and light from one or both of the first light receptacle and the second light receptacle is emitted onto the instrument panel, the gap and the door panel.

In at least some implementations, a fore-aft direction is defined between a forward end and rearward end of the passenger compartment, a cross-car direction is defined between opposite sides of the passenger compartment and is perpendicular to the fore-aft direction, and a vertical direction is defined between a top and bottom of the passenger compartment, and wherein the first light receptacle overlaps the second light receptacle in fore-aft direction.

In at least some implementations, the first light receptacle and the second light receptacle are separated in the cross-car direction by a gap.

In at least some implementations, the first light receptacle also overlaps the second light receptacle in the vertical direction.

In at least some implementations, the first lighting assembly includes a first housing that defines part of the first interior trim panel and wherein light emitted from the first lighting assembly is emitted onto the first housing, and wherein the second lighting assembly includes a second housing that defines part of the second interior trim panel and wherein light emitted from the second lighting assembly is emitted onto the second housing.

In at least some implementations, the first lighting assembly includes an outlet from which light is emitted and the second lighting assembly includes an outlet from which light is emitted, and wherein a portion of the outlet of the first lighting assembly overlaps a portion of the outlet of the second lighting assembly so that some of the light emitted from the first lighting assembly is directed onto the same portion of at least one of the instrument panel and the door panel as some of light emitted from the second lighting assembly.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
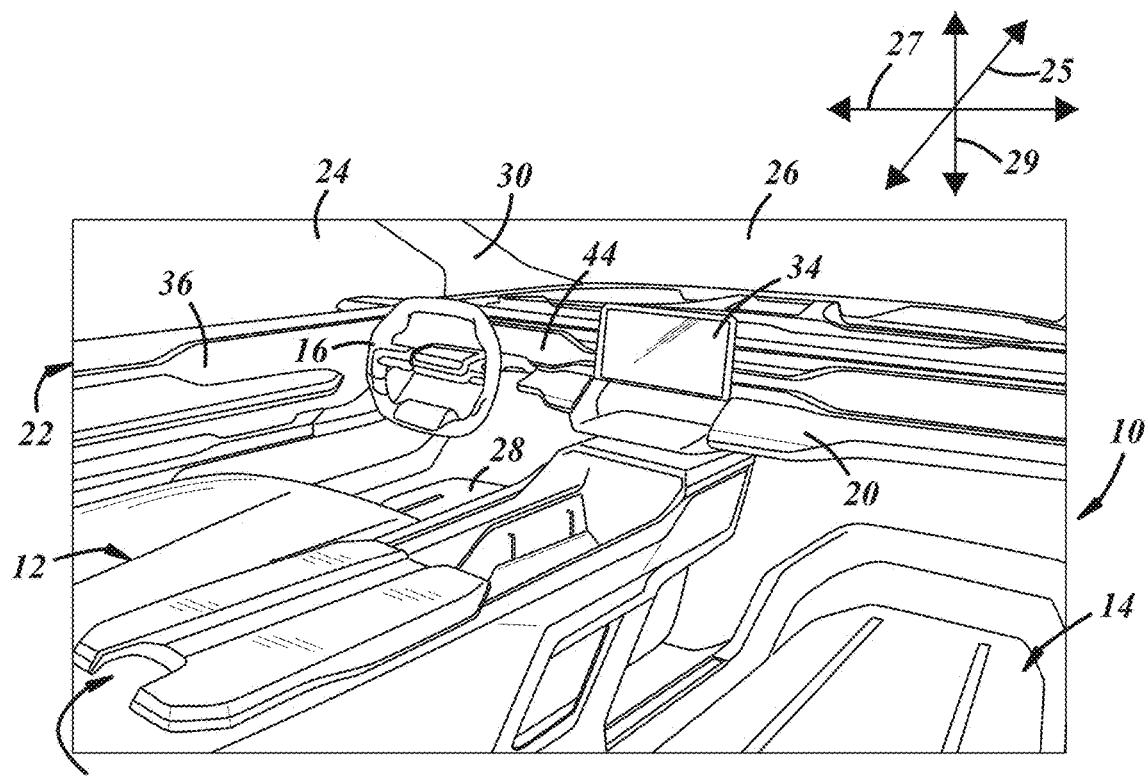
FIG. 1 is a perspective view of a portion of a vehicle passenger compartment.

Referring in more detail to the drawings, FIG. 1 illustrates part of a vehicle passenger compartment 10. The passenger compartment 10 is shown as including two front seats 12, 14 that are commonly referred to as a driver's seat 12 with a steering wheel 16 or other steering input in front of the driver seat 12, and a front passenger's seat 14 generally next to driver's seat 12. The passenger compartment 10 may include a console 18 between the seats 12, 14, and an instrument panel 20 or dashboard in front of the seats 12, 14 and generally at a forward end of the passenger compartment 10, and one or more doors 22 at and defining part of the opposite (e.g. left and right) sides of the passenger compartment 10. The doors 22 may include windows 24, and the passenger compartment 10 may further be defined by a windshield 26 at the forward end, a rear window (not shown) and the rearward end, a floor 28 at the bottom and a roof (not shown) at the top of the passenger compartment 10. In this disclosure: 1) the direction between the forward and rearward ends of the passenger compartment 10 is called the fore-aft direction and is generally indicated by arrow 25; 2) the direction between opposite sides of the vehicle, e.g. left and right sides and defined in part by one or more doors 22, is called the cross-car direction and is generally indicated by arrow 27; and 3) the direction between the floor and roof is called the vertical direction and is generally indicated by arrow 29.

To improve the appearance and comfort of the passenger compartment 10, and for other reasons, various components that define parts of the passenger compartment 10, like parts of the vehicle frame or substructure, the doors 22, roof, floor and pillars 30 (e.g. A, B and C pillars) extending to the roof, include interior trim components. The interior trim components may include fabric layers, like carpet, a headliner, seat coverings as well as interior trim pieces molded from a variety of materials.

Figure 2:
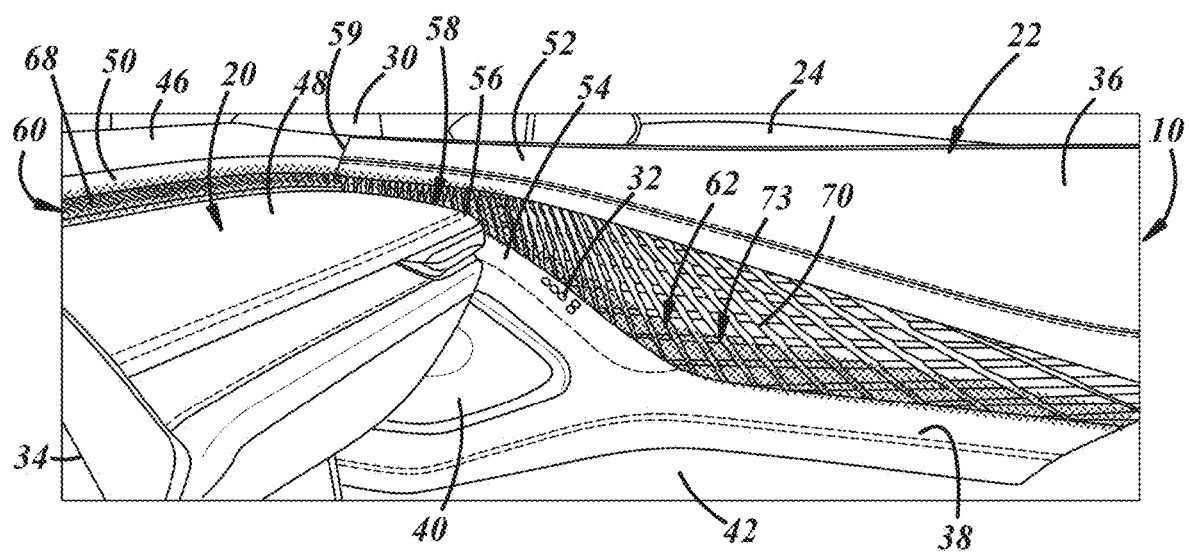
FIG. 2 is a perspective view of a portion of the passenger compartment and including part of a door and part of an instrument panel or dashboard.

In addition to covering structural components, the interior trim components may cover and/or mount and provide access to electronic and mechanical devices, such as switches 32 (FIG. 2), knobs, display screens 34 (FIGS. 1 and 2), door handles, gear shifters, interior lights such as overhead lights mounted at the roof, and the like. For example, as shown in FIG. 2, a door 22 may include one or more interior trim components such as door panel 36 that extends mostly vertically, an armrest 38 mounted to the door panel 36 and extending fore/aft and in the cross-car direction into the passenger compartment 10, and a speaker cover 40 mounted to the door panel 36. A switch 32 for opening and closing the window 24 may be provided in/on the armrest 38 or door panel 36, and a storage compartment 42 may be formed in the door panel 36 and located beneath the armrest 38.

As shown in FIGS. 1 and 2, the instrument panel 20 may extend in the cross-car direction and rearward from the windshield 26 toward the front seats 12, 14. The instrument panel 20 may include openings or mounts for display of gauges 44 (FIG. 1), an infotainment display screen 34, HVAC vents and a storage compartment (e.g. glove box). In the implementation shown in FIG. 2, the instrument panel 20 includes a first portion 46 adjacent to the windshield 26 and extending in the cross-car direction and part of the way outward toward the passenger seat 14 in the fore-aft direction, and the instrument panel 20 includes a second portion 48 that extends in the fore-aft direction from the first portion. The second portion 48 is lower, vertically, than the first portion 46 and a transition 50 or step is defined between the portions 46, 48. The door panel 36 may also include an upper portion 52 closest to the window 24 and vertically aligned with the first portion 46 of the instrument panel 20 at a forward end of the upper portion 52, providing a continuing surface between the panels 20, 36. Similarly, a forward part 54 of the armrest 38 may be inclined vertically and generally aligned with the second portion 48 of the instrument panel 20 so that the door panel 36 generally matches the contours and shapes of the instrument panel 20.

When the door 22 is closed, as shown in FIG. 2, part of the door 22, in this example the forward end of the door 22, that is closest to the front end of the passenger compartment 10, is adjacent in the cross-car direction to a side edge 56 of the instrument panel 20. A gap or gaps 58 are defined between them, where the gap(s) 58 may include one or more seams 59 or separating lines between adjacent portions of the panels 20, 36, and these components 20, 36 overlap each other in the vertical and fore-aft directions. Other interior trim components may likewise by adjacent to and may partially overlap other interior trim components. For example, a rearward end of the door 22 may be overlapped by a b-pillar trim component, and so on.

For decoration and to illuminate various features and components, for example, accent lighting may be provided within and radiating from one or more interior trim components. The accent lighting may be in the form of one or more lights, such as but not limited to LEDs, that emit light in discrete areas or in continuous runs or lengths of light. Among other things, use of LEDs as a light source provides an energy efficient system and allows the color and/or intensity or brightness of the emitted light to be easily changed by a user and thus, permits customization of the appearance of the passenger compartment 10, as desired by a user.

As shown in FIGS. 3-6, the instrument panel 20 and the door panel 36 both contain a lighting assembly, with the instrument panel having a first lighting assembly 60 and the door panel having a second lighting assembly 62. In at least some implementations, the lighting assemblies 60, 62 each include a light source 64, 66, a housing 68, 70 that is mounted to or formed as part of the associated door panel 36 or instrument panel 20, a light receptacle 72, 74 (e.g. light pipe or light guide) having an interior in which the light source 64, 66 is received or into which light is emitted from the light source, and an outlet 76, 78 which may include a diffusor or lens through which light is projected outwardly from the light receptacles 72, 74. The light receptacles 72, 74 may include an opening or gap with a lens or diffuser in the opening or gap, or the outlets 76, 78 may be defined by a translucent or transparent portion of the light receptacles 72, 74. The light sources 64, 66 may include one or more LED lights, and are shown as (for example in FIGS. 5 and 6) including an LED engine including at least one LED 80, 82 and a controller 84, 86, such as an electronic control unit (ECU) by which the operation of the LED can be controlled. In at least some implementations, the LED brightness and/or color can be adjusted by a user through a suitable vehicle interface (e.g. an option provided by the infotainment system, or via an application run on a remote device, such as a phone or tablet, that is coupled to the vehicle by a wired or wireless connection).

The one or more LEDs of each lighting assembly 60, 62 is/are arranged to emit light into the light receptacles 72, 74 so that most or all of the length of each light receptacle 72, 74 is illuminated, and so that light is emitted through the outlets/diffusers 76, 78 along the length of the light receptacles 72, 74. In the example shown, the lighting assemblies 60, 62 each include two light sources 64, 66 (e.g. two light engines), with one at each end of the light receptacles 72, 74 and with each directing light generally toward the other to provide suitable illumination along the length of the lighting assemblies 60, 62 between the light sources 64, 66.

Further, the light receptacles 72, 74 and outlets 76, 78 may be constructed and arranged to provide a nearly uniform intensity of light along the length of these components to reduce or eliminate bright and dim spots, and provide more uniform light along the length of the assemblies 60, 62. In at least some implementations, the light source will have an output from about 0.5 lumens to 30 lumens. In examples in which multiple light sources (e.g. multiple LEDs) are used, then each may have an output in this range, as desired (for example, forty LEDs each having an output of 3 lumens can provide a total output of 120 lumens for that assembly). In at least some implementations, the light receptacles or light guides are constructed of a molded plastic, such as PMMA (polymethyl methacrylate), with optics/diffusers/outlets molded or otherwise associated with the part at desired spacing. Each optic/diffuser/outlet redirects outwardly a portion of the light from within the light guide and into a light path 73 (FIG. 2) of uniform intensity projected onto the target surface(s). In at least some implementations, the diffuser material can be a plastic material, such as a polycarbonate plastic, with either a semitranslucent white or gray color, or in some cases clear depending on light output needs.

Figure 4:
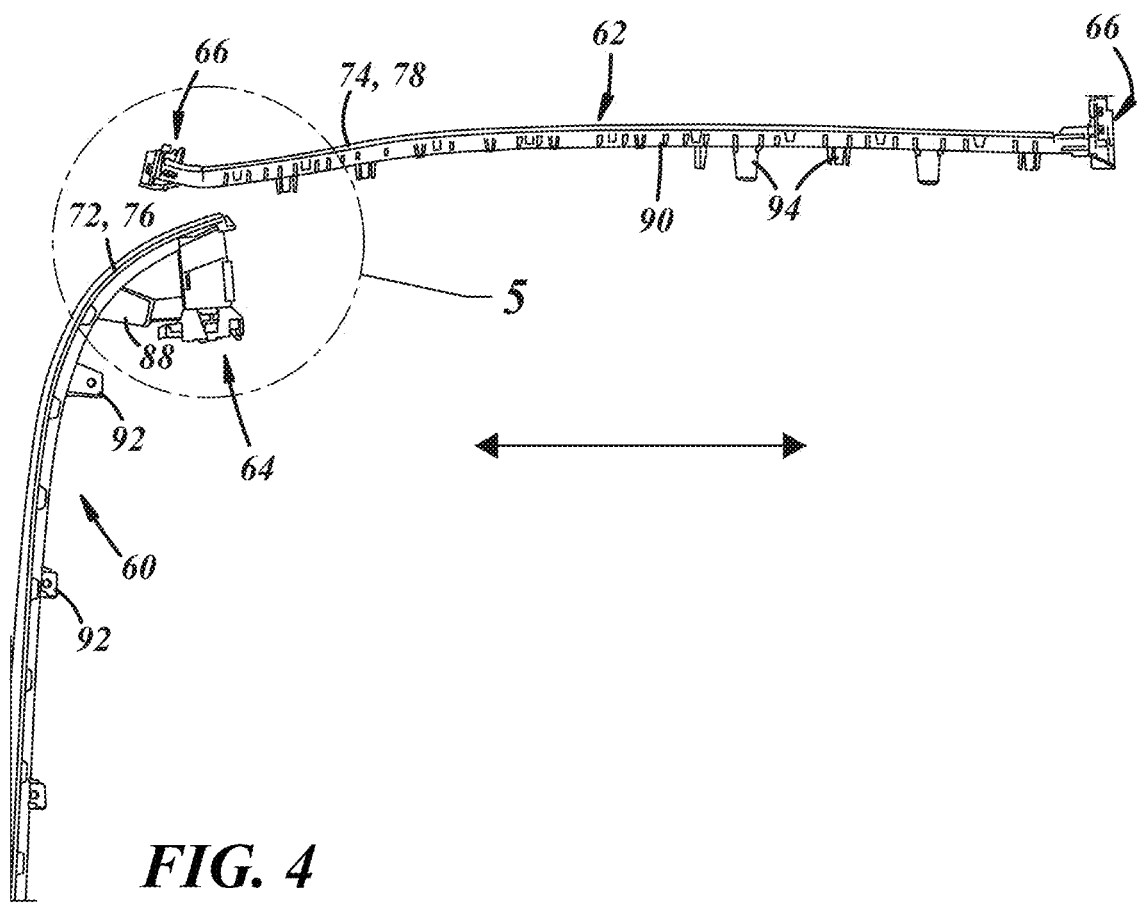
FIG. 4 is a top view of the lighting assemblies.
Figure 5:
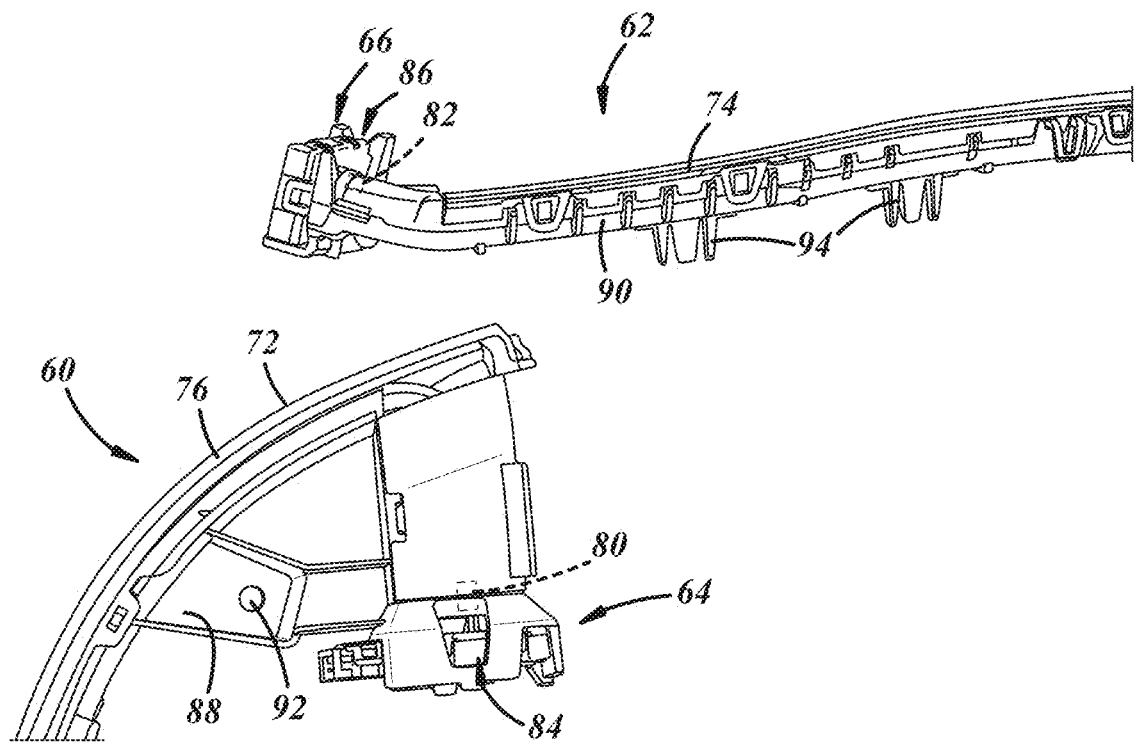
FIG. 5 is an enlarged top view of the encircled portion 5 in FIG. 4.
Figure 6:
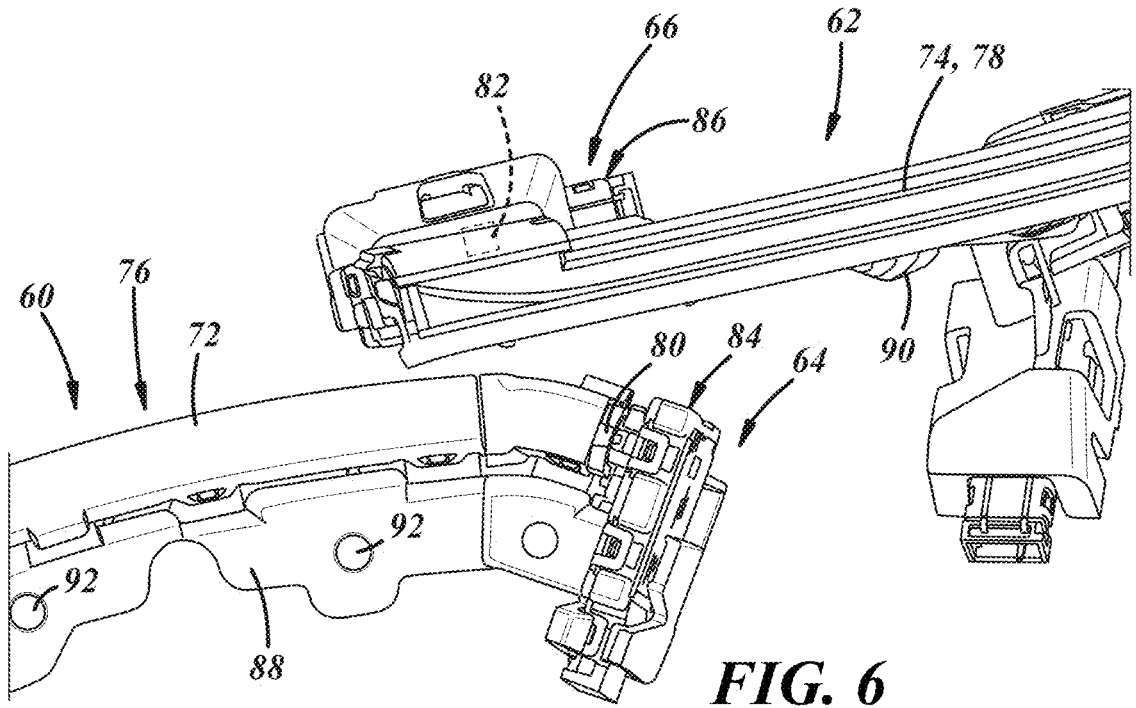
FIG. 6 is a side view of part of the lighting assemblies.

The housings 68, 70 may have any suitable shape and may extend along a major dimension or length of the associated panels 20, 36, following the contours thereof. In the implementation shown, the light receptacles 72, 74 are located along a lower edge of the respective housings 68, 70 and, in assembly of the vehicle, are hidden behind an interior trim component like the instrument panel 20 and door panel 36 in this example. In the example shown, the light receptacle 72 and light source 64 for the instrument panel 20 lighting assembly 60 are hidden or covered by the second portion 48 of the instrument panel 20, and the light receptacle 74 and light source 66 for the door panel 36 are hidden or covered by the armrest 38. Of course, other arrangements may be provided. As shown in FIGS. 4-6, each light assembly 60, 62 may include a bracket or other mounting body 88, 90 including connection features 92, 94 for coupling to the associated panels 20, 36. The connection features may be arranged for a snap-fit with the associated panel or to receive a fastener that connects the components together.

Figure 3:
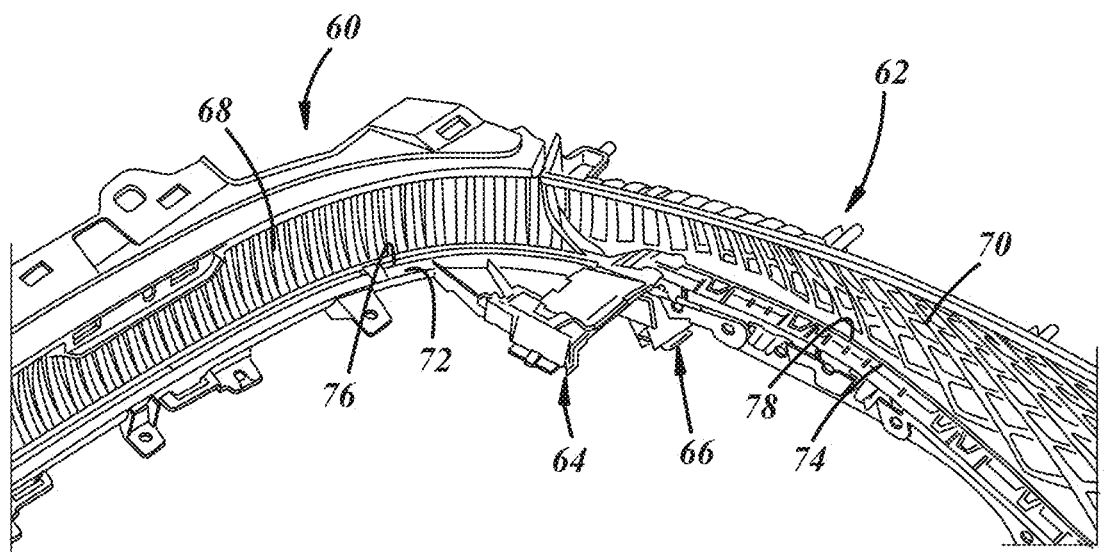
FIG. 3 is perspective view of part of a trim component and lighting assembly for the door, and part of a trim component and lighting assembly for the instrument panel.

As shown in FIGS. 2 and 3, the lighting assemblies 60, 62 may be arranged so that the diffusers or other outlets 76, 78 from which light is emitted from the assemblies may be arranged to project light onto predetermined areas of the instrument panel 20 and door panel 36, which includes the housings 68, 70 in the implementation shown. The housings 68, 70 may include decorative features 82 like ribs or other shapes, mesh or carbon fiber surfaces or textures, badges identifying the vehicle brand and/or model and other features, as desired. When light is projected onto the housings 68, 70, such features and other surfaces of the panels 20, 36 can be illuminated providing an attractive display. Further, the ambient light provided can illuminate features like badges, switches, knobs, handles and the like within the vehicle, to improve user interaction with those features.

FIGS. 3-6 illustrate the components of the example lighting assemblies 60, 62 in the position they are in when the door 22 is closed, as is shown in FIG. 2. FIG. 3 illustrates the lighting assemblies 60, 62 including the housings 68, 70, and FIGS. 4-6 illustrate the lighting assemblies 60, 62 without the housings 68, 70. In this position, the light receptacle 72 of the instrument panel lighting assembly 60 overlaps the light receptacle 74 of the door panel lighting assembly 62. Further, the light diffuser or outlet 76 of the light receptacle 72 of the instrument panel lighting assembly 60 overlaps the light diffuser or outlet 78 of the light receptacle 74 of the door panel lighting assembly 62. The overlap is in the fore-aft direction and in the vertical direction. There is a gap 58 between these components in the cross-car direction to accommodate parts of the instrument panel 20 and the door panel 36 that are located within the gap 58. The gap may be between zero mm and fifty mm in the cross-car direction.

In at least some implementations, the overlap between the two light receptacles 72, 74 includes a location or area of the output along each at which light is emitted, and wherein the light emitted in the area of overlap is at least 30% and up to 130% of the nominal output of the light assemblies 60, 62, where the nominal output is a maximum lumen output. Thus, in at least some implementations, the overlap is not simply any physical overlap of the structures of the light receptacles 72, 74 but an overlap of the light emitting portions or outlets 76, 78 of the light receptacles. In at least some implementations, the light emitting portions or outlets 76, 78 of the light receptacles 72, 74 are overlapped by some amount, and in some examples between 1 mm to 50 mm. The overlap may occur in both a first direction which may be called a length and define a major dimension of the light receptacle and associated path or area of emitted light, and in a second direction which may be called width and define a second, minor dimension of the light receptacle and the associated path or area of emitted light. In the example of the instrument panel 20, the first dimension (length) may be oriented generally in the cross-car direction and the second dimension (width) in the vertical direction. In the example of the door panel 36, the first dimension (length) may be oriented in the fore-aft direction and the second dimension (width) in the vertical direction. The diffusers or other outlets 76, 78 of the light receptacles 72, 74 may be oriented so that the emitted light from both receptacles, in the area in which the emitted light overlaps, is aligned/overlapped and blends together.

An effect of the overlap between the light receptacles 72, 74 is that light can be emitted in a continuous path 73, as shown by way of one example in FIG. 2, spanning from the instrument panel 20 to the door panel 36, across the gap(s) 58 or seams 59 between these panels. The path 73 of emitted light is shown in FIG. 2 by way of speckles or dots on the panels 20, 36, and this may represent light of any desired color(s). Light emitted into the gap 58 is incident upon a surface beyond an opening of the gap 58 (part of the door panel 36 in the illustrated implementation) and light is reflected in the gap 58, providing a continuous path or pattern of light across at least part of the instrument panel 20, door panel 36 and the gap 58 between them. Further, emitted light in the path 73 spans the seams 59 between adjacent portions of the panels. In this way, there is not a significant dim spot or area that is not illuminated, as occurs with interior lighting assemblies that do not include the noted overlap of light receptacles. For example, light assemblies that are constrained to only one panel or trim component do not provide significant light on other panels or across gaps in the components, and dim and unlit areas exist between the spaced apart lights. The uniform light, in a continuous path or pattern of light provided by the overlapped light assemblies can make the passenger compartment 10 feel more integrated and uniform, and improve the distribution of light to reduce bright and dim spots.

What is claimed is:

1. An assembly for a vehicle, comprising:
    a first interior trim component;
    a second interior trim component located adjacent to the first interior trim component with a gap or seam between the second interior trim component and the first interior trim component;
    a first lighting assembly associated with the first interior trim component, the first lighting assembly including a first light source and a first light receptacle into which light is emitted from the first light source and from which light is emitted onto the first interior trim component; and
    a second lighting assembly associated with the second interior trim component, the second lighting assembly including a second light source and a second light receptacle into which light is emitted from the second light source and from which light is emitted onto the second interior trim component, wherein, the first light receptacle overlaps the second light receptacle and light from one or both of the first light receptacle and the second light receptacle is emitted onto the first interior trim component, the gap and the second interior trim component.

2. The assembly of claim 1 wherein the first light source and second light source include at least one LED light.

3. The assembly of claim 1 wherein the first light receptacle and the second light receptacle are overlapped in two directions that are perpendicular to each other, and wherein the gap extends in a third direction perpendicular to the two directions.

4. The assembly of claim 3 wherein a portion of the first interior trim panel overlaps a portion of the second interior trim panel.

5. The assembly of claim 4 wherein the first interior trim panel is at least part of an instrument panel of the vehicle and the second interior trim panel is connected to a door of the vehicle, and wherein the portion of the first interior trim panel overlaps the portion of the second interior trim panel when the door is in a closed position.

6. The assembly of claim 1 wherein the first lighting assembly includes a first housing that defines part of the first interior trim panel and wherein light emitted from the first lighting assembly is emitted onto the first housing.

7. The assembly of claim 1 wherein the second lighting assembly includes a second housing that defines part of the second interior trim panel and wherein light emitted from the second lighting assembly is emitted onto the second housing.

8. The assembly of claim 1 wherein the first lighting assembly includes an outlet from which light is emitted and the second lighting assembly includes an outlet from which light is emitted, and wherein a portion of the outlet of the first lighting assembly overlaps a portion of the outlet of the second lighting assembly so that some of the light emitted from the first lighting assembly is directed onto the same portion of at least one of the first interior trim panel and the second interior trim panel as some of light emitted from the second lighting assembly.

9. The assembly of claim 8 wherein the overlapped portions of the first lighting assembly and the second lighting assembly are in areas of the outlets at which the light emitted is at least 30% of the nominal output along the length of one or both of the first light receptacle and the second light receptacle.

10. The assembly of claim 1 wherein the first light receptacle overlaps the second light receptacle by between 1 mm and 50 mm in a first direction.

11. A vehicle, comprising:
    a passenger compartment defined in part by an instrument panel and a door panel, wherein the door panel is located adjacent to the instrument panel with a gap or seam between the door panel and the instrument panel;
    a first lighting assembly associated with the instrument panel, the first lighting assembly including a first light source and a first light receptacle into which light is emitted from the first light source and from which light is emitted onto the instrument panel; and
    a second lighting assembly associated with the door panel, the second lighting assembly including a second light source and a second light receptacle into which light is emitted from the second light source and from which light is emitted onto the door panel, wherein, the first light receptacle overlaps the second light receptacle and light from one or both of the first light receptacle and the second light receptacle is emitted onto the instrument panel, the gap and the door panel.

12. The vehicle of claim 11 wherein a fore-aft direction is defined between a forward end and rearward end of the passenger compartment, a cross-car direction is defined between opposite sides of the passenger compartment and is perpendicular to the fore-aft direction, and a vertical direction is defined between a top and bottom of the passenger compartment, and wherein the first light receptacle overlaps the second light receptacle in fore-aft direction.

13. The vehicle of claim 11 wherein the first light receptacle and the second light receptacle are separated in the cross-car direction by a gap.

14. The vehicle of claim 11 wherein the first light receptacle also overlaps the second light receptacle in the vertical direction.

15. The vehicle of claim 11 wherein the first lighting assembly includes a first housing that defines part of the first interior trim panel and wherein light emitted from the first lighting assembly is emitted onto the first housing, and wherein the second lighting assembly includes a second housing that defines part of the second interior trim panel and wherein light emitted from the second lighting assembly is emitted onto the second housing.

16. The vehicle of claim 11 wherein the first lighting assembly includes an outlet from which light is emitted and the second lighting assembly includes an outlet from which light is emitted, and wherein a portion of the outlet of the first lighting assembly overlaps a portion of the outlet of the second lighting assembly so that some of the light emitted from the first lighting assembly is directed onto the same portion of at least one of the instrument panel and the door panel as some of light emitted from the second lighting assembly.

17. The vehicle of claim 16 wherein the overlapped portions of the first lighting assembly and the second lighting assembly are in areas of the outlets at which the light emitted is at least 30% of the nominal output along the length of one or both of the first light receptacle and the second light receptacle.

18. The vehicle of claim 11 wherein the first light receptacle overlaps the second light receptacle by between 1 mm and 50 mm in a first direction.

* * * * *